June 6, 1961  J. P. URBON  2,987,094
TUBELESS PNEUMATIC TIRE
Filed Dec. 18, 1957

INVENTOR.
JOHN P. URBON
BY
R. L. Miller
ATTORNEY

United States Patent Office 2,987,094
Patented June 6, 1961

2,987,094
TUBELESS PNEUMATIC TIRE
John Peter Urbon, Cuyahoga Falls, Ohio, assignor to The Goodyear Tire & Rubber Company, Akron, Ohio, a corporation of Ohio
Filed Dec. 18, 1957, Ser. No. 703,519
6 Claims. (Cl. 152—357)

This invention relates to tubeless pneumatic tires of the open-bellied type and in particular it relates to the compounding of the plies of the tire carcass.

It is well known to mount pneumatic tire casings directly on wheel rims without using a conventional inner tube to retain the air depending instead upon the seamless drop center rim to help retain the air in the casing by virtue of an air-tight seal formed between the heel face of the bead of the casing and the rim flange of the rim and an air valve mounted in the rim.

Many difficulties have been encountered in using the tire casing in combination with the rim as an air retaining chamber not encountered when using a conventional inner tube as the air retaining chamber. One difficulty is in the failure of the casing through ply separation caused by the bleeding or diffusion of the encased air through the rubber portion of the casing and into the interstices found in the reinforcing cords of the tire. This diffused air ultimately exerts its pressure directly against the outer plies of the tire and particularly between the outer ply and the tread and sidewall portions of the tire. When this air pressure builds up high enough in any one area it forms air pockets and causes the plies of the carcass to separate and at sustained high speeds the centrifugal force exerted on the component parts of the tire works in combination with these air pockets to hasten ply separation causing the tread and other outer parts of the tire to be blown loose from the carcass damaging the tire in most cases beyond repair.

Many expedients have been used to prevent the inflationary air in tubeless tires from bleeding or diffusing into the carcass. A liner or a coating of rubber on the internal surface of a tubeless tire has been used but increases the cost of the tire, adds to the weight of the tire, and develops excessive heat at high running speeds and in time fails to retain inflationary air to any greater extent than the ordinary inner tube formerly used with the pneumatic tire. In fact, since the liner of a tubeless tire is made of a thinner gauge rubber ply than the ordinary tube, the air-retaining capacity is less than that of a conventional inner tube. Again, as shown in Belgian Patent 542,222 and in Canadian Patent 531,289, attempts have been made to retain the inflationary air by impregnating the reinforcing cords with compositions which are resinous in nature but it has been found that it is impossible to reduce the air diffusion rate to substantially zero and at the same time maintain a high degree of flexibility necessary in the reinforcing cords.

Therefore, it is the principal object of this invention to develop a tubeless pneumatic tire having improved air retaining properties. More specifically the principal object of this invention is to develop a tubeless pneumatic tire having a migratory liquid blocking means which seeks out the interstices of the reinforcing cords of the tire gathering therein to effectively block the passage of air through the interstices of the cord. Still more specifically the principal object of this invention is to build a tubeless pneumatic tire casing with plies of rubber-coated tire-cord fabric the rubber of which has been compounded with an exudative liquid and particularly a migratory oil which is not compatible with or being very slightly soluble in the rubber as for example a hydroxylated oil such as castor oil, etc. which migrates to the interstices of the cord in sufficient amount to act as a liquid filler thereby blocking passage of air through the interstices while at the same time improving the flexible nature of the cord. It is still another object of this invention to provide a liquid blocking medium which may be compounded with the rubber portion of the ply and which then is caused to accumulate in the interstices of the reinforcing cords after the plies have been assembled into a tire carcass.

The above and other objects will be apparent from the following description, reference being had to the drawings in which.

Figure 1:
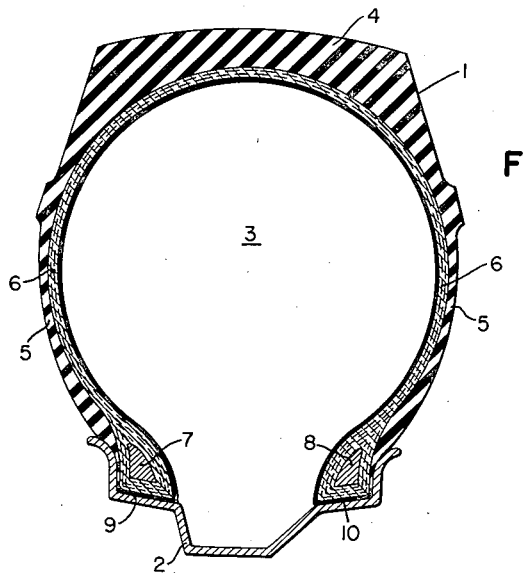
FIG. 1 is a fragmentary cross sectional view of a tire construction of conventional design made in accordance with and embodying this invention.

FIG. 1 shows a tubeless tire 1 mounted on a rim 2 forming an air chamber 3 for the inflationary air of the tire. Both the tire 1 and the rim 2 are of conventional construction. The tire 1 is made up of a tread portion 4, sidewalls 5, and fabric plies 6 anchored to the beads 7 and 8 which in turn form the bead seats 9 and 10 of the tire 1.

The plies 6 are also constructed in a conventional manner and in the present invention were made from rayon cord fabric treated with a conventional adhesive composition comprising a rubber latex and a phenol/aldehyde resin which adhesive acts to bond the fabric to a skim coat of rubber calendered onto both sides of the fabric all in a conventional manner.

The novel feature of the present invention concerns the compounding of the rubber used to coat the fabric. The rubber which may be used in this invention and which may be natural rubber or any of the conventional synthetic rubbers used in tire construction is compounded in a manner similar to conventional methods with the exception that an exudative liquid is worked into the rubber to be skim coated onto the fabric. The tubeless pneumatic tires of this invention were constructed in a conventional manner using for the control tire conventional rubber compounding ingredients for the plies of the tire and using for the improved tire of this invention the same rubber compounding ingredients with the exception that a liquid migratory oil was added to the rubber before coating the rubber onto a rayon reinforcing fabric. The formulations for the control tire and for the improved tire of this invention are set forth as follows:

| Compounding Ingredients | Example 1 Control Tire, parts | Example 2 Tire Containing Oil, parts |
| --- | --- | --- |
| Natural rubber | 100.00 | 100.00 |
| Stearic acid | 2.00 | 2.00 |
| Carbon black | 30.00 | 30.00 |
| Dibenzothiazyl disulfide | .50 | .50 |
| Mercapto benzothiazole | .75 | .75 |
| Diphenyl guanidine | .30 | .30 |
| Zinc oxide | 3.00 | 3.00 |
| Sulfur | 2.75 | 2.75 |
| Rosin oil | 7.50 | |
| Medium process oil (mineral oil) | 5.00 | |
| Castor oil | | 12.50 |

The natural rubber is placed in a Banbury internal mixer along with the compounding ingredients listed above and mixed into a homogeneous blend. The rubber may also be placed on a warm-up mill and mixed with these ingredients until a band and a rolling bank of rubber is established. The rosin oil and the medium process oil are used as a fabricating aid since they help to soften and give tack to the compounded rubber. The rosin oil is a well known ingredient having a specific gravity of 1.02, a saponification number of 110 and an acid number of 85. Commercially, the rosin oil is sold as Sanostac 7L by the Southern Naval Stores, a division of Leach Brothers. The medium process oil is a mineral oil having a specific gravity of .900, a Saybolt (SUS 100° F.) value of 108 seconds and an aniline point of 170° F. and commercially sold by the Atlantic Refining Company as Coporol Oil B. The castor oil used in this invention had a specific gravity of .958, a saponification number of 180, an acid number of 8 and an iodine number of 85 and is commercially sold by the Baker Castor Oil Company as commercial castor oil #3.

Each of the rubber compounds were skim coated onto rayon fabric and built into a conventional four-ply tubeless pneumatic time. The control tire, the carcass of which was made of the compounded rubber of Example 1, and the improved tire, the carcass of which was made of the compounded rubber of Example 2, were each mounted on a conventional automobile wheel rim and each inflated with air to a gauge pressure of 26 p.s.i. The two tires were maintained at a constant temperature for 168 hours and then measured for air pressure build up in the cords of the outer or fourth ply of each tire. It was found that 17½ pounds of air pressure had developed in the cords of the control tire and that no pressure was found to have been built up in the cords of the improved tire of this invention.

Each tire was then tested for the purpose of determining the number of miles necessary to cause failure of the tire due to separation of the plies, using a load of 995 pounds on each tire while rotating each tire at a speed of 35 miles per hour at an inflationary pressure of 26 p.s.i. against a cleated rotating surface. Each tire had been inflated and mounted 7 days prior to being mile tested. It was found that the control tire developed visual signs of failure through ply separation after running 4,529 miles whereas the tire of this invention containing castor oil developed visual signs of failure through ply separation after having run 6,711 miles. Again a control tire and the improved tire of this invention were each tested under a load of 2,250 pounds running at a speed of 75 miles per hour at an inflationary pressure of 21 p.s.i. against a smooth surface in which the tires were alternatively run for ¼ of a minute and then rested for 3¾ of a minute throughout the course of the test. It was observed that the control tire developed visual evidence of failure after 4,853 miles whereas the tire of this invention containing castor oil developed visual evidence of failure after 7,394 miles. These results were surprising and unexpected because the presence of foreign matter such as an incompatible oil would lead one to believe that undesirable secondary effects such as poor adhesion of rubber to cord would develop.

Similar results were obtained when the tire carcasses of Examples 1 and 2 were made with a blend of 70 parts of natural rubber and 30 parts of conventional GR–S rubber (an 80/20 butadiene/styrene copolymer) in place of natural rubber. Also similar results were obtained when the tire carcasses of Examples 1 and 2 were made using 40 parts of natural rubber and 60 parts whole tire reclaim in which the reclaimed rubber comprised approximately 80% GR–S rubber and 20% natural rubber. Similar desirable results were obtained when the tire carcasses of Examples 1 and 2 were made with a blend of 33⅓ parts of natural rubber, 33⅓ parts of GR–S rubber and 33⅓ parts of the whole tire reclaim above mentioned. Similar results were also obtained when these carcasses were made using fabric of cotton cord, when using fabric of nylon cord and when using fabric of steel cord. Similar results are also obtained when the rubber of these carcasses is compounded with as little as 3 parts of castor oil in place of 12.5 parts.

The following table contains information in regard to a few of the many different constructions that may be used in making cords of cotton, rayon, nylon or steel.

*Table I*

| | Cotton | Rayon | Nylon | Steel |
| --- | --- | --- | --- | --- |
| Construction | 11's/4/2 | 1650/2 | 840/2 | .0058''/3/7 |
| Twist, t.p.i. | 10.8/16.7/10.3 | 12.0/12.2 | 12.1/12.1 | –/2.9/3.1 |
| Gage, in. | .032 | .028 | .020 | .035 |
| Denier | 4,395 | 3,795 | 1,870 | 28,144 |
| Dia.—inches | .00062 | .00058 | .00110 | .00580 |
| Rel. Dia | 1.00 | .94 | 1.77 | 9.35 |
| Denier/Fil | 2.6 | 2.3 | 6.3 | 1,320 |

Figure 2:
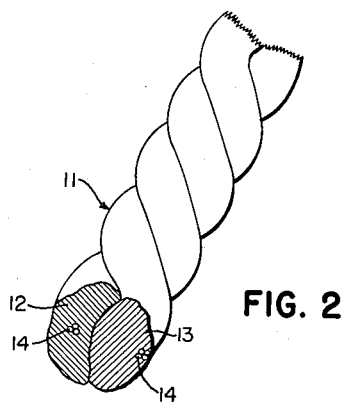
FIG. 2 is an isometric view of a two-ply reinforcing cord showing the cables of the cord in twisted relationship with each other.

FIG. 2 shows a conventional two-ply tire cord 11 made up of cables 12 and 13 each of which in turn is made up of a great many individual filaments, a few shown greatly enlarged at 14, the number depending upon the material used. For example, in the case of rayon as shown in Table I above, 1650 filaments were used in making a single cable 12 and in the case of nylon 840 filaments were used in making a single cable.

Figure 3:
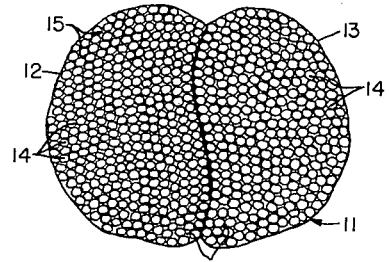
FIG. 3 is a cross sectional view of the cord shown in FIG. 2 greatly enlarged and showing the interstices dedeveloped by the filaments of the cord.

FIG. 3 shows the cord of FIG. 2 in greater detail showing the individual filaments 14 used in making up the cables 12 and 13 of the cord 11 and showing the interstices or voids 15 formed throughout the length of the cord by virtue of the spacing taken by the filaments relative to each other.

Figure 4:
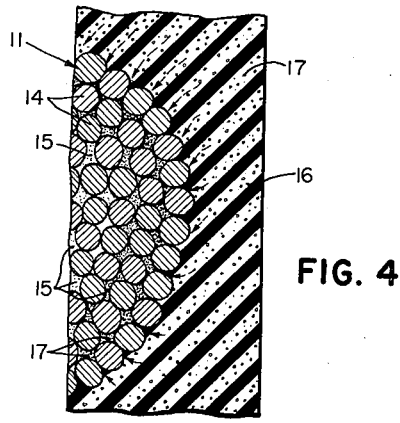
FIG. 4 is an enlarged cross sectional view of a portion of a ply of the tire of FIG. 1 showing how the exudative liquid has migrated from the rubber surrounding a portion of a reinforcing cord to the interstices formed by the filaments of the cord.

FIG. 4 shows a portion of the cord shown in FIG. 2 embedded in a rubber skim coat 16 containing an exudative oil symbolically shown at 17 and which oil has accumulated in the interstices 15 by reason of the fact that the oil is incompatible with the rubber composition of the skim coat and therefore tends to migrate to a surface of the rubber particularly the surfaces surrounding the reinforcing cord. In the instant invention, castor oil is the exudative material used in the rubber skim coat and it has been found that the castor oil migrates to the rubber surface surrounding the cord and forms droplets of oil which droplets then work into the interstices of the cord at various places along the length of the cord forming barriers against the movement of the air through the interstices formed by the filaments of the cord.

Figure 5:
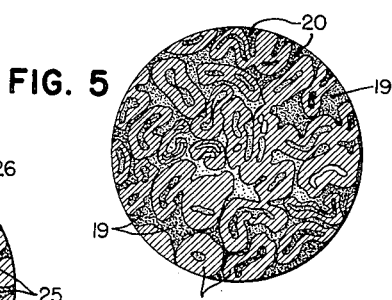
FIG. 5 is a greatly enlarged cross sectional view of a portion of a cotton cord showing the individual cotton fibers and the interstices formed thereby containing an exudative liquid.

FIG. 5 shows a portion of a cotton cord made up of cotton fibers 18 forming interstices 19 blocked at intervals with the gathering of an exudative oil 20 into droplets at intervals along the length of the interstices. The more oil used in the rubber skim coat the greater will be the amount of oil gathered by migration in these interstices. In fact, if enough oil is used, the interstices will be filled completely with the oil as it migrated from the rubber to the voids.

Figure 6:
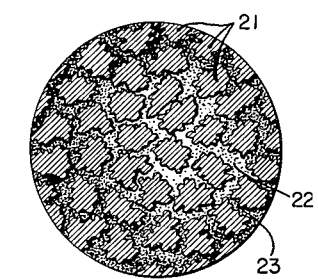
FIG. 6 is a greatly enlarged cross sectional view of a portion of a rayon cord showing the individual rayon filaments and the interstices formed thereby containing an exudative liquid.

FIG. 6 shows a portion of a rayon cord made up of rayon filaments 21 each having an irregular surface and forming interstices 22 blocked at intervals with an exudative liquid 23.

Figure 7:
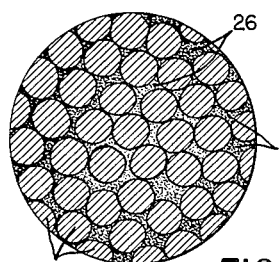
FIG. 7 is a greatly enlarged cross sectional view of a portion of a nylon cord showing the individual nylon filaments and the interstices formed by the filaments containing an exudative liquid.

FIG. 7 shows a portion of a nylon cord made up of nylon filaments 24 which in turn form interstices 25 which are blocked at intervals with an exudative liquid 26.

Any liquid which is not compatible with or of a relatively low solubility i.e. about 1 to 3% soluble in the rubber composition used in making the carcass of a conventional pneumatic tubeless tire may be used in this invention. Particularly useful migratory liquids are the oils that tend to migrate or exude from the rubber into which they have been compounded and it has been observed that of particular value are the hydroxylated oils which are of a very low degree of solubility in the rubber and of special value is castor oil. Also the esters of the fatty acids may be used including the esters of ricinoleic acid and more specifically methylricinoleate, ethyl ricinoleate, propyl ricinoleate, butyl ricinoleate, glycerine α-mono-ricinoleate, and the esters of myristic acid such as gamma-chloro-propylene glycol-α-myristate. Certain polyesters may also be used including polypropylene adipate, polypropylene azalate and polyethylene adipate. Polyglycols may also be used including the polyethylene glycols having an average molecular weight of 200, 300, 400, and 600 each of which are oils; the polypropylene glycols having an average molecular weight of 150, 425, 1025, and 2025 each of which are liquids; the methoxy polyethylene glycols having an average molecular weight of 350, 550, and 750 with the lower two being oils and the other having a freezing point of 27–32° C.; and such other poly glycols as the polybutylene glycols and the polyneopentyl glycols. It is preferable to use the lower molecular weight poly glycols. The above mentioned polyglycols may also be esterfied with fatty acids to yield the corresponding mono or di-esters each of which can be used in the present invention where the resulting compound is an oil and of a very slight solubility in the rubber composition. Glycerin particularly ethylene glycol may also be used in the present invention. These oils may be used in amounts sufficient to cause effective blockage in the cord structure of the tire. It has been observed that effective blockage does not depend upon complete elimination of the interstitial area of the cord but it has been observed that partial occupancy of the interstices of the cords by the exudative oil is sufficient to produce effective blockage of air or loss of air from the chamber 3 of the tubeless tire shown in FIG. 1. In the case of castor oil, 12½ parts of oil per 100 parts of rubber hydrocarbon effectively reduces to zero the loss of air from a conventional pneumatic tubeless tire. It has been found that as little as 3 parts of castor oil may be used but it is preferred to use from 5 parts to 15 parts. It is not desirable to use more than 15 parts since effective blockage is produced using a lesser amount.

The present invention is particularly adapted to the construction of tubeless pneumatic tires, however, the invention also finds use in the manufacture of pneumatic air springs, high pressure air hose, high altitude flying pressurized suits, and air mat fabric. In each of these hollow articles of manufacture, the present invention finds value by virtue of the fact that these articles are made of a plurality of twisted filaments such as cotton, rayon, or nylon and therefore, are required to be impervious to the passage of air internally of the structure to the exterior thereof. However, the principal value of the present invention finds its most important use in the manufacture of tubeless pneumatic tires because of the exceptional stresses developed by the tire in use and because of the particularly essential requirement that the tire not lose air through the reinforcing cords because of the damaging effect such as loss of air has on the construction of the tire particularly when subjected to high speeds.

While certain representative embodiments and details have been shown for the purpose of illustrating the invention, it will be apparent to those skilled in this art that various changes and modifications may be made therein without departing from the spirit or scope of the invention.

What is claimed is:

1. A tubeless pneumatic tire comprising an open-bellied hollow annular body terminating in spaced apart bead portions and forming at least in part an air-retaining chamber suitable for retaining air under pressure, said body containing at least one ply of vulcanized rubber reinforced with cords composed of a plurality of filaments which form interstices in said cord into which air diffuses under pressure from said chamber and then moves through said interstices along the length of the cord, said rubber containing a rubber-incompatible exudative liquid at least a portion of which has exuded into the interstices of the cords thereby forming a block against the movement of said air through said interstices and thereby preventing the constant loss of air by diffusion from said chamber into said interstices.

2. A tubeless pneumatic tire comprising an open-bellied hollow annular body terminating in spaced apart bead portions and forming at least in part an air-retaining chamber suitable for retaining air under pressure, said body containing at least one ply of vulcanized rubber extending from bead to bead and reinforced with cords embedded in said vulcanized rubber and composed of a plurality of filaments which form interstices in said cord into which air diffuses under pressure from said chamber and then moves through said interstices along the length of the cord, said rubber containing a rubber-incompatible migratory oil at least a portion of which has exuded into the interstices of the cords thereby forming a block against the movement of said air through said interstices and thereby preventing the constant loss of air by diffusion from said chamber into said interstices.

3. A tubeless pneumatic tire comprising an open-bellied hollow annular body terminating in spaced apart bead portions and forming at least in part an air-retaining chamber suitable for retaining air under pressure, said body containing at least one ply of vulcanized rubber reinforced with cords composed of a plurality of filaments which form interstices in said cord into which air diffuses under pressure from said chamber and then moves through said interstices along the length of the cord, said rubber containing a hydroxylated oil at least a portion of which has exuded into the interstices of the cords thereby forming a block against the movement of said air through said interstices and thereby preventing the constant loss of air by diffusion from said chamber into said interstices.

4. A tubeless pneumatic tire comprising an open-bellied hollow annular body terminating in spaced apart bead portions and forming at least in part an air-retaining chamber suitable for retaining air under pressure, said body containing at least one ply of vulcanized rubber reinforced with cords composed of a plurality of filaments which form interstices in said cord into which air diffuses under pressure from said chamber and then moves through said interstices along the length of the cord, said rubber containing castor oil at least a portion of which has exuded into the interstices of the cords thereby forming a block against the movement of said air through said interstices and thereby preventing the constant loss of air by diffusion from said chamber into said interstices.

5. A tubeless pneumatic tire comprising an open-bellied hollow annular body terminating in spaced apart bead portions and forming at least in part an air-retaining chamber suitable for retaining air under pressure, said body containing at least one ply of vulcanized rubber reinforced with cords composed of a plurality of filaments which form interstices in said cord into which air diffuses under pressure from said chamber and then moves through said interstices along the length of the cord, said rubber containing castor oil in an amount from about 3 parts to about 15 parts per 100 parts of rubber, at least a portion of which has exuded into the interstices of the cords thereby forming a block against the movement of said air through said interstices and thereby preventing the constant loss of air by diffusion from said chamber into said interstices.

6. A tubeless pneumatic tire comprising an open-bellied hollow annular body terminating in spaced apart bead portions and forming at least in part an air-retaining chamber suitable for retaining air under pressure, said body containing at least one ply of vulcanized rubber reinforced with cords composed of a plurality of filaments which form interstices in said cord into which air diffuses under pressure from said chamber and then moves through said interstices along the length of the cord, said rubber containing about 12 parts of castor oil per 100 parts of rubber, at least a portion of which has exuded into the interstices of the cords thereby forming a block against the movement of said air through said interstices and thereby preventing the constant loss of air by diffusion from said chamber into said interstices.

References Cited in the file of this patent

UNITED STATES PATENTS

| | | |
|---|---|---|
| 1,903,038 | Fujii | Mar. 28, 1933 |
| 2,685,904 | Brandau | Aug. 10, 1954 |
| 2,700,997 | Morrissey et al. | Feb. 1, 1955 |
| 2,788,839 | Kindle et al. | Apr. 16, 1957 |
| 2,795,262 | Frank | June 11, 1957 |
| 2,844,181 | Riggs et al. | July 22, 1958 |